(12) United States Patent
Schmidt

(10) Patent No.: US 7,261,661 B2
(45) Date of Patent: Aug. 28, 2007

(54) PARALLEL HYBRID TRANSMISSION HAVING A SINGLE MOTOR/GENERATOR

(75) Inventor: Michael R. Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 183 days.

(21) Appl. No.: 11/217,923

(22) Filed: Sep. 1, 2005

(65) Prior Publication Data

US 2007/0049441 A1 Mar. 1, 2007

(51) Int. Cl.
*F16H 3/72* (2006.01)
(52) U.S. Cl. .......................................... 475/5; 903/911
(58) Field of Classification Search ............... 475/4, 475/5, 8, 330, 317, 149, 279, 282; 903/908, 903/909, 910, 911, 926; 180/65.2, 65.3, 180/65.6, 53.1; F16H 3/72
See application file for complete search history.

(56) References Cited

U.S. PATENT DOCUMENTS

| | | | |
|---|---|---|---|
| 4,407,132 A | 10/1983 | Kawakatsu et al. | 60/716 |
| 5,713,425 A | 2/1998 | Buschhaus et al. | 180/65.2 |
| 5,839,533 A | 11/1998 | Mikami et al. | 180/165 |
| 5,856,709 A | 1/1999 | Ibaraki et al. | 290/45 |
| 5,937,757 A | 8/1999 | Jackson et al. | 101/232 |
| 6,090,005 A * | 7/2000 | Schmidt et al. | 475/5 |
| 6,098,733 A | 8/2000 | Ibaraki et al. | 180/65.2 |
| 6,428,444 B1 * | 8/2002 | Tabata | 477/3 |
| 6,488,608 B2 | 12/2002 | Yamaguchi et al. | 477/3 |
| 6,491,599 B1 * | 12/2002 | Schmidt | 475/5 |
| 6,527,658 B2 | 3/2003 | Holmes et al. | 475/5 |
| 6,527,659 B1 | 3/2003 | Klemen et al. | 475/5 |
| 6,592,484 B1 | 7/2003 | Tsai et al. | 475/5 |
| 6,953,409 B2 * | 10/2005 | Schmidt et al. | 475/5 |
| 2006/0128513 A1* | 6/2006 | Tata et al. | 475/5 |
| 2006/0148604 A1* | 7/2006 | Raghavan et al. | 475/5 |
| 2006/0154772 A1* | 7/2006 | Schmidt et al. | 475/5 |

\* cited by examiner

*Primary Examiner*—Charles A. Marmor
*Assistant Examiner*—Justin K. Holmes

(57) ABSTRACT

A reduced cost, compact parallel hybrid transmission having only a single motor/generator is provided. The transmission utilizes a reduced number of components, preferably only three interconnecting members and four torque-transmitting mechanisms, to provide a reverse speed mode and seven forward speed modes (i.e., operating states achieved by engagement of a particular torque-transmitting mechanism or torque-transmitting mechanisms, whether encompassing a continuous range of speed ratios or only a fixed speed ratio). At least five of the forward modes are fixed speed ratios.

19 Claims, 3 Drawing Sheets

PARALLEL HYBRID TRANSMISSION HAVING A SINGLE MOTOR/GENERATOR

TECHNICAL FIELD

The present invention relates to electrically variable transmissions having parallel power flow and a single electric unit.

BACKGROUND OF THE INVENTION

Internal combustion engines, particularly those of the reciprocating piston type, currently propel most vehicles. Such engines are relatively efficient, compact, lightweight, and inexpensive mechanisms by, which to convert highly concentrated energy in the form of fuel into useful mechanical power. A novel transmission system, which can be used with internal combustion engines and which can reduce fuel consumption and emissions, may be of great benefit to the public.

The wide variation in the demands that vehicles typically place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate with some independence from the torque, speed and power required to propel a vehicle, so the engine may be controlled for improved emissions and efficiency. This system allows the electric machine attached to the engine to act as a motor to start the engine. This system also allows the electric machine attached to the remainder of the drive train to act as a generator, recovering energy from slowing the vehicle into the battery by regenerative braking. A series electric drive suffers from the weight and cost of sufficient electric machinery to transform all of the engine power from mechanical to electrical in the generator and from electrical to mechanical in the drive motor, and from the useful energy lost in these conversions.

A power-split transmission can use what is commonly understood to be "differential gearing" to achieve a continuously variable torque and speed ratio between input and output. An electrically variable transmission can use differential gearing to send a fraction of its transmitted power through a pair of electric motor/generators. The remainder of its power flows through another, parallel path that is all mechanical and direct, of fixed ratio, or alternatively selectable.

One form of differential gearing, as is well known to those skilled in this art, may constitute a planetary gear set. Planetary gearing is usually the preferred embodiment employed in differentially geared inventions, with the advantages of compactness and different torque and speed ratios among all members of the planetary gear set. However, it is possible to construct this invention without planetary gears, as by using bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

An electrically variable transmission in a vehicle can simply transmit mechanical power from an engine input to a final drive output. To do so, the electric power produced by one motor/generator balances the electrical losses and the electric power consumed by the other motor/generator. By using the above-referenced electrical storage battery, the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

SUMMARY OF THE INVENTION

A reduced cost, compact parallel hybrid transmission having only a single motor/generator is provided. The transmission utilizes a reduced number of components, preferably only three interconnecting members and four torque-transmitting mechanisms, to provide a reverse speed mode and seven forward speed modes. As used herein, a "mode" is a particular operating state, whether encompassing a continuous range of speed ratios or only a fixed speed ratio, achieved by engagement of a particular torque-transmitting mechanism or torque-transmitting mechanisms. At least five of the forward modes are fixed speed ratios.

The hybrid electro-mechanical transmission includes an input member for receiving power from a power source and an output member for delivering power from the transmission. Only a single motor/generator is used. An energy storage device is used for interchanging electrical power with the motor/generator. Three planetary gear sets are utilized each having a first, second and third member. Preferably, the first, second and third planetary gear sets are coaxially aligned and the motor/generator annularly circumscribes at least one of the planetary gear sets. First, second and third interconnecting members each continuously interconnect a different one of the members of one of the planetary gear sets with another different one of the members of another of the planetary gear sets. Four torque-transmitting mechanisms are selectively engagable alone or in pairs to provide a reverse mode powered only by the motor/generator, a launch mode powered only by the motor/generator and at least five modes of fixed forward speed ratios powered by the power source and optionally the motor/generator. That is, the four torque-transmitting mechanisms are operable to provide at least five fixed forward speed ratios whether or not power flows through the motor/generator.

In one aspect of the invention, the first member of the first planetary gear set is continuously interconnected with the input member. The first member of the third planetary gear set is continuously connected with the output member. The first interconnecting member continuously connects the second member of the first planetary gear set with the first member of the second planetary gear set. The second interconnecting member continuously connects the third member of the first planetary gear set with the second member of the second planetary gear set. The third interconnecting member continuously connects the third member of the second planetary gear set with the second member of the third planetary gear set. Preferably, the interconnecting members are concentric.

In another aspect of the invention, a control unit is provided for regulating electrical power interchange between the energy storage device and the motor/generator.

In another aspect of the invention, the first, second and third members of each of the planetary gear sets include a ring gear member, a sun gear member and a carrier member. The ring gear member of the first planetary gear set is continuously connected with the input member and the carrier member of the third planetary gear set is continuously connected with the output member. The carrier member of the first planetary gear set is continuously connected with the carrier member of the second planetary gear set via the first interconnecting member. The sun gear member of the first planetary gear set is continuously connected with the ring gear member of the second planetary gear set via the second interconnecting member. The sun gear member of the third planetary gear set is continuously connected with the motor/generator and is continuously connected to the sun gear member of the second planetary gear set via the third interconnecting member.

In still another aspect of the invention, the first torque-transmitting mechanism selectively connects the ring gear member of the first planetary gear set with the ring gear member of the second planetary gear set. The second torque-transmitting mechanism selectively connects the sun gear member of the first planetary gear set with the stationary member. The third torque-transmitting mechanism selectively connects the ring gear member of the third planetary gear set with the stationary member. The fourth torque-transmitting mechanism selectively connects the carrier members of the first and second planetary gear sets with the carrier member of the third planetary gear set.

This single motor/generator parallel hybrid transmission has a lower overall transmission cost because a second motor/generator is not used nor is a second power inverter necessary, as is typically required for an additional motor/generator. Additionally, at cruise during the seventh forward speed mode, no power (i.e., substantially zero) flows through the motor/generator yet the motor/generator provides significant torque at a very low speed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
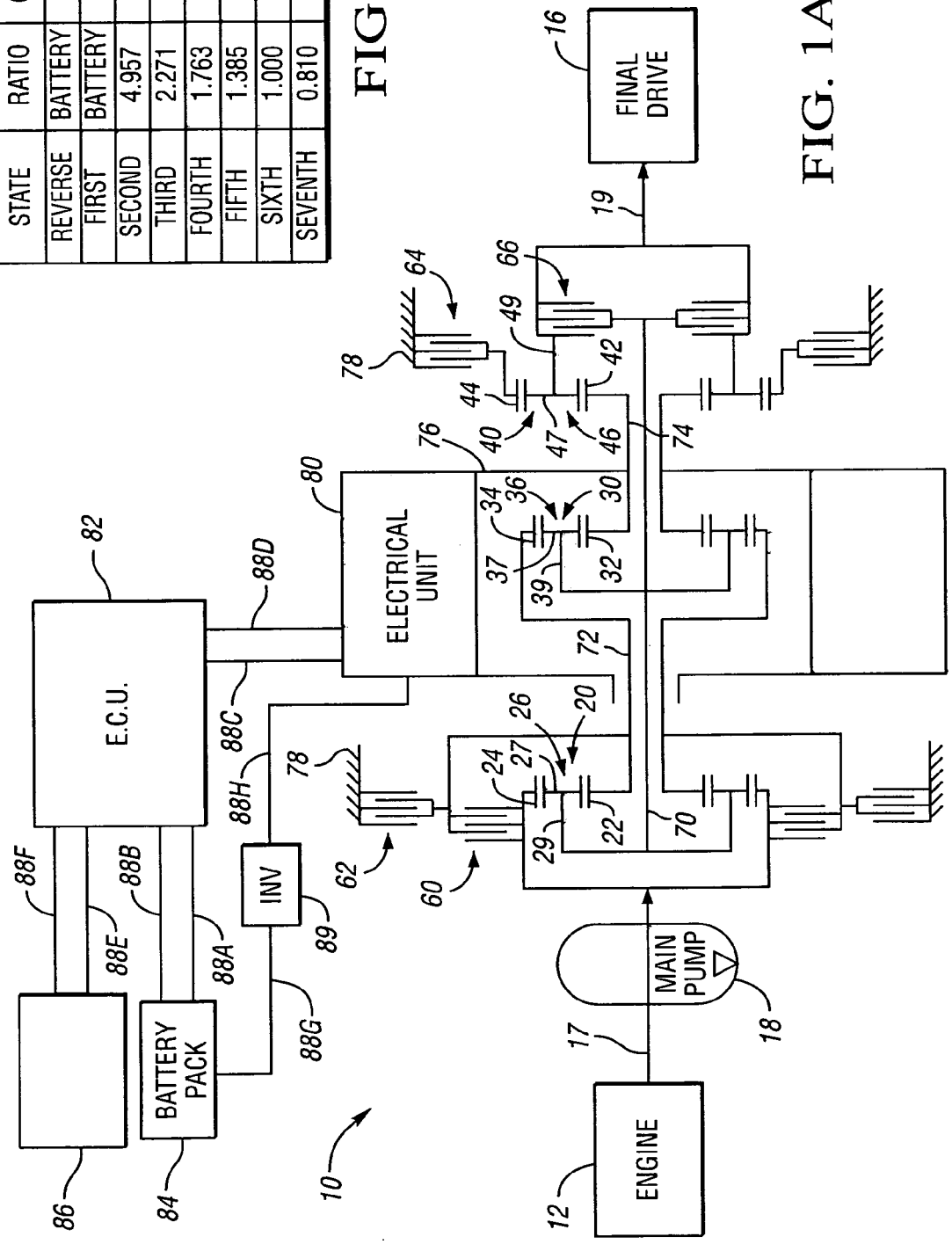
FIG. 1A is a schematic representation of an electro-mechanical transmission having a single motor/generator embodying the concepts of the present invention.
FIG. 1B is a chart depicting various operating conditions of the electro-mechanical transmission of FIG. 1A.

One representative form of an electro-mechanical transmission having a single motor/generator embodying the concepts of the present invention is depicted in FIG. 1A, and is designated generally by the numeral 10. The hybrid transmission 10 has an input member 17 that may be in the nature of a shaft which may be directly driven by an engine 12. The engine 12 may be a fossil fuel engine, such as an internal combustion engine or a diesel engine, which is readily adapted to provide its available power output delivered at a constant number of revolutions per minute (rpm). A pump 18 may be driven off of the input member 17 for providing lubrication and cooling fluid throughout the transmission 10. Power flows from the input member 17 through the transmission 10 as will be described below to be delivered at an output member 19 for powering a final drive 16.

The transmission 10 includes a first planetary gear set 20 that includes a sun gear member 22, a ring gear member 24 circumscribing the sun gear member 22 and a planet carrier assembly member 26 including a plurality of pinion gear 27 rotatably mounted on a carrier member 29 in meshingly engaging with both the ring gear member 24 and the sun gear member 22. The input member 17 is continuously connected with the ring gear member 24 for providing power thereto.

The transmission 10 further includes a second planetary gear set 30 including a sun gear member 32, a ring gear member 34 circumscribing the sun gear member 32 and a planet carrier assembly member 36 including a plurality of pinion gears 37 rotatably supported on a carrier member 39 and meshing engaging both the ring gear member 34 and the sun gear member 32. The carrier member 29 is continuously connected with the carrier member 39 via an interconnecting member 70 which is an interconnecting shaft. The sun gear member 22 is continuously connected with the ring gear member 34 via an interconnecting member 72, which is a rotatable sleeve shaft and is concentrically arranged about interconnecting member 70.

Furthermore, the transmission 10 includes a third planetary gear set 40 including a sun gear member 42, a ring gear member 44 circumscribing the sun gear member 42 and a planet carrier assembly member 46 including a plurality of pinion gears 47 rotatably mounted on a carrier member 49 and meshingly engaging with both the ring gear member 44 and the sun gear member 42. The sun gear member 32 is continuously connected with the sun gear member 42 via an interconnecting member 74 which is another rotatable sleeve shaft concentrically arranged about interconnecting member 70. The carrier member 49 is continuously connected with the output member 19.

The input member 17 and output member 19 are aligned to form an axis of rotation therethrough. A single motor/generator 80 (which maybe referred to herein as an electric unit) is concentrically disposed about the common axis of rotation formed by the input member 17 and output member 19 for rotation thereabout. As will be well understood by those skilled in the art, the motor/generator 80 includes a stator secured to a stationary member such as a transmission housing 78 as well as a rotatable rotor. The rotor of the motor/generator 80 is secured to the sun gear members 32 and 42 for common rotation therewith via a hub 76 and interconnecting member 74.

As should be apparent from the foregoing description, the transmission 10 selectively receives power from the engine 12. The hybrid transmission may also receive power from an energy storage device 84 such as a battery pack. Other electric storage devices that have the ability to store electric power and dispense electric power may be used in place of the battery pack without altering the concepts of the present invention. The battery pack 84 may include one or more batteries. The power output of the battery pack 84 is not critical to the invention, but for the purpose of affecting a clear understanding of the hybrid transmission 10 an output power of about 35 horsepower (hp) from the battery pack 84 will be assumed for description of the transmission 10. The battery pack 84 will be sized depending on regenerative requirements, regional issues such as grade and temperature, and other requirements such as emissions, power assist and electric range.

The battery pack 84 communicates with an electrical control unit (ECU) 82 by transfer conductors 88A and 88B. The ECU 82 communicates with the motor/generator 80 by transfer conductors 88C and 88D. Additionally, the ECU 82 communicates with other vehicle electrical components 86, such as electrical power steering, and electrical power braking systems, etc., via transfer conductors 88E and 88F. Preferably, the maximum electrical power requirements of the other electrical components 86 is such that no more than 2 horsepower (hp) is required to power these components.

The ECU 82 responds to a variety of input signals including vehicle speed, operator demand, the level to which the battery pack 84 is charged and the power being applied by the engine 12, to regulate the flow of power between the motor/generator 80 and the battery pack 84. The ECU 82 can manipulate the motor/generator 80 to act as either a motor or a generator. The ECU 82 also regulates the flow of power via transfer conductors 88G and 88H between the battery pack 84 and the motor/generator 80 through power inverter 89 to convert between direct current power utilized by the battery pack 84 and alternating current power utilized by and/or generated by the motor/generator 80.

A first torque-transmitting mechanism 60, which is a rotating clutch torque-transmitting mechanism, selectively connects the ring gear member 24 with the sun gear member 22 and also with the ring gear member 34 via the interconnecting member 72. Thus, when the torque-transmitting mechanism 60 is engaged, the ring gear member 24 and the sun gear member 22 rotate at the same speed, causing the entire planetary gear set 20 to rotate at the speed of the input member 17. A second torque-transmitting mechanism 62, which is a brake, selectively engages the sun gear member 22 and the ring gear member 34 with the stationary transmission housing 78. A third torque-transmitting mechanism 64, which is also a brake, selectively engages the ring gear member 44 with the transmission housing 78. Finally, a fourth torque-transmitting mechanism 66, which is a rotating type clutch, selectively engages the carrier members 29 and 39 with the carrier member 49 and also the output member 19 via interconnecting member 70. The engagement schedule of the torque-transmitting mechanisms 60, 62, 64 and 66 is provided in FIG. 1B. As maybe seen from the truth table of FIG. 1B, a reverse battery powered mode, a first battery powered forward mode, as well as second, third, fourth, fifth, sixth and seventh forward speed ratio modes are provided by the transmission 10. The speed ratios shown in FIG. 1B are for purposes of example only and are achieved with tooth ratio counts as follows. In the planetary gear set 20, the ring gear member 24 has 91 teeth and the sun gear member 22 has 35 teeth; in the planetary gear set 30 the ring gear member 34 has 91 teeth and the sun gear member 32 has 45 teeth; and in the planetary gear set 40, the ring gear member 44 has 91 teeth and the sun gear member 42 has 23 teeth.

Reverse Mode

To establish a reverse mode with a reverse direction of drive, the torque-transmitting mechanism 64 is engaged to connect the ring gear member 44 with the transmission housing 78. The engine 12 may not be utilized in the reverse mode because the rotation of the input member 17 is necessarily in the same direction of rotation as the output member 19 in the transmission 10. Accordingly, the motor/generator 80 acts as a motor to power the output member 19 in a reverse direction when clutch 64 is engaged and the electronic control unit 82 determines that reverse is required by operator demand. Electronic control unit 82 signals the battery pack 84 to power the motor/generator 80 via electrical power routed through the inverter 89 along transfer conductors 88G and 88H. Accordingly, assuming that a clockwise direction of rotation of the output member 19 is able to power the vehicle in a forward direction, the motor/generator is powered to act as a motor by rotating in counterclockwise direction, therefore turning the sun gear member 42 in counterclockwise direction. Because the ring gear member 44 is held stationary by the brake 64, the pinion gears 47 rotate in a clockwise direction and the carrier member 49, and therefore the output member 19 rotates in a counterclockwise direction.

Figure 2:
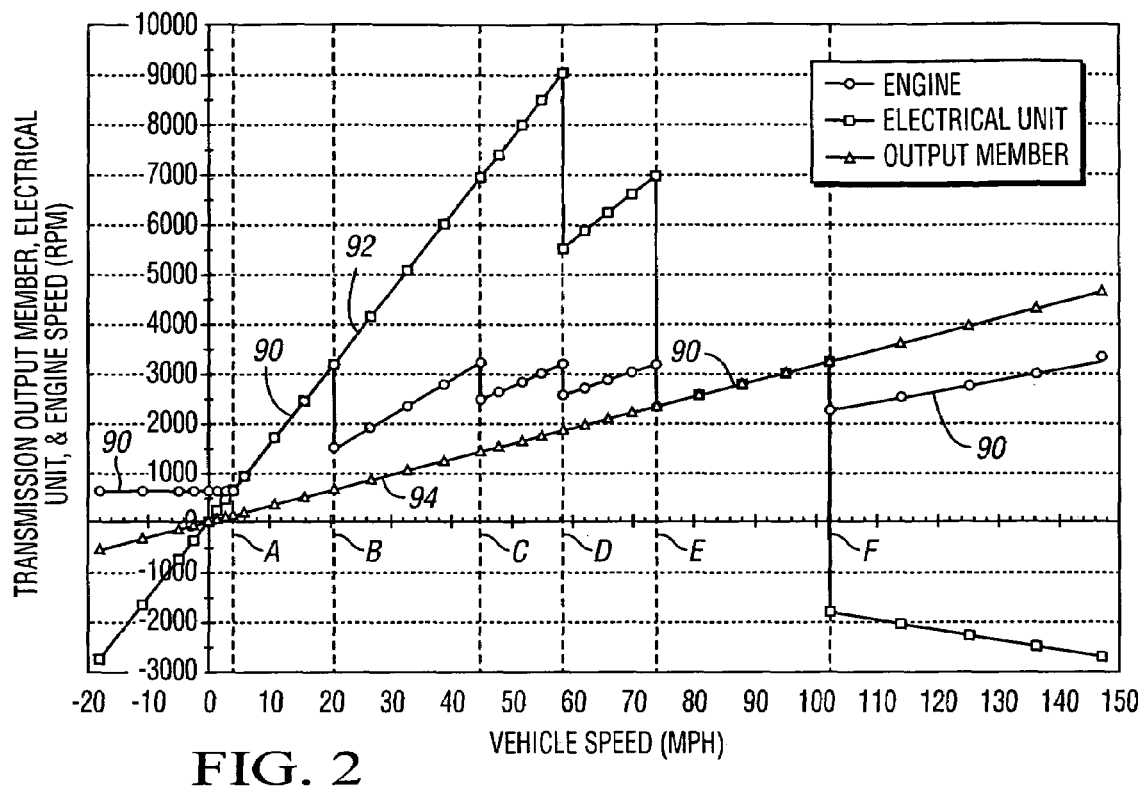
FIG. 2 is a graphical representation of the speed in rotations per minute (rpm) of the motor/generator as well as the engine and the output member relative to the speed of the vehicle in miles per hour (mph) during transient pull conditions.

Referring to FIG. 2, operating speeds during sample transient pull conditions are illustrated (i.e., conditions in which the vehicle is subjected to heavy loading or acceleration). The reverse operation is illustrated in the portion of the graph with negative vehicle speeds. The speed of the engine is illustrated by the plot 90, the speed of the electric unit is illustrated by the plot 92, and the speed of the transmission output member is illustrated by the plot 94. When the vehicle speed is negative, the electric unit and transmission output member both rotate in the same direction. The speed of the engine is shown at plot 90; however, power is not added by the engine 12 during the reverse operating mode.

Figure 3:
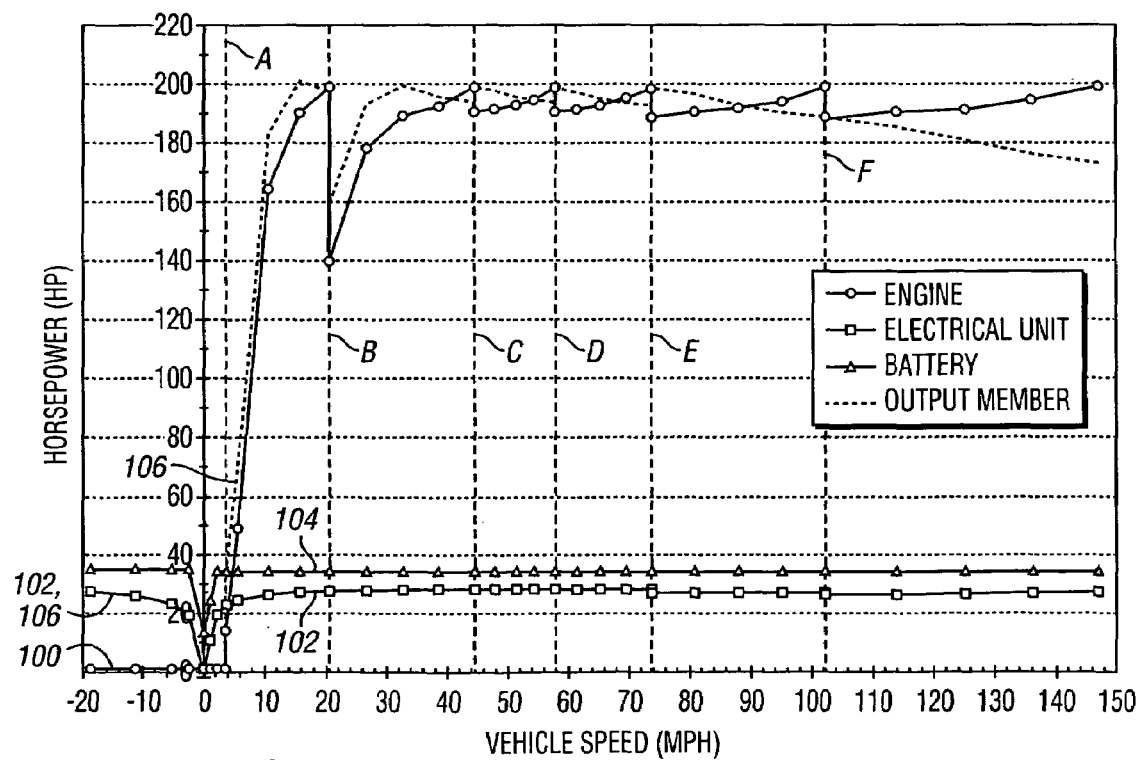
FIG. 3 is a graphical representation of horsepower (hp) of the motor/generator, the engine, the energy storage device and the output member relative to the speed of the vehicle in miles per hour (mph) during transient pull conditions.

FIG. 3 illustrates the power of various components during the transient pull conditions that result in the speeds of FIG. 2. Horsepower of the engine is denoted by plot 100, horsepower of the electrical unit 80 is denoted by plot 102, horsepower of the battery pack 84 is denoted by plot 104 and horsepower at the transmission output member 19 is denoted by plot 106. When the vehicle has a negative speed, the power at the output member 19 is the same as the power of the motor/generator 80, and therefore the plots 102 and 106 overlay one another in the reverse operating mode (i.e., when vehicle speeds are negative). Power through the engine 12, shown at plot 100, is zero in this range. Additionally, power through the battery is at its maximum level, 35 horsepower (hp).

Launch/First Forward Mode

When the transmission 10 is used to launch the vehicle, the torque-transmitting mechanism 64 is engaged just as it was in the reverse mode. The motor/generator 80 is the prime mover in the first/launch mode, acting as a motor via power received from the battery pack 84 under the control of the electronic control unit 82. The rotor portion of the motor/generator is controlled to rotate in a clockwise direction, thereby rotating the interconnecting member 74 and the sun gear member 42 in a clockwise direction. Because the ring gear member 44 is braked, with the sample tooth count discussed above, the carrier member 49 and output member 19 will be driven in a clockwise or forward direction of rotation for powering the final drive 16. The engine 12 may be utilized to add power during launch if the torque-transmitting mechanism 60 is engaged at a slip (i.e. less than full engagement) such that the entire planetary gear set 20 rotates in the same direction as the input member 17 to thereby add driving power to the ring gear member 34.

Figure 4:
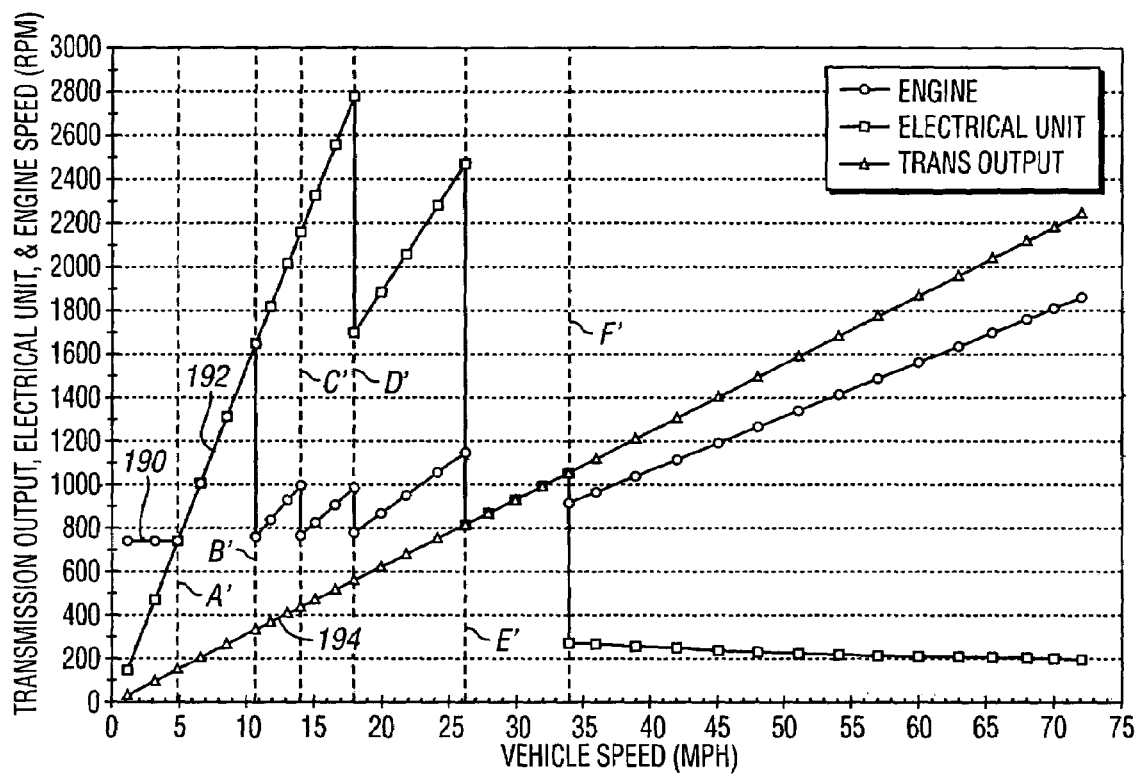
FIG. 4 is a graphical representation of the speed in rotations per minute (rpm) of the motor/generator, the engine and the output member relative to the speed of the vehicle in miles per hour (mph) during cruise conditions.
Figure 5:
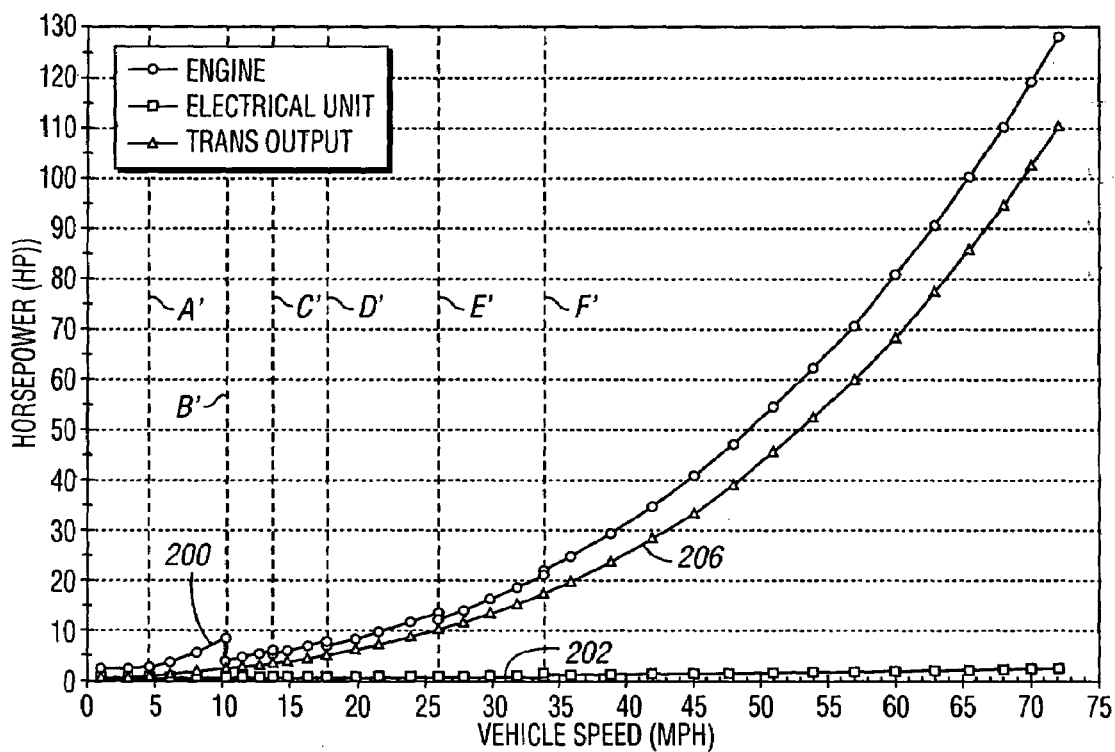
FIG. 5 is a graphical representation of horsepower (hp) of the motor/generator, the engine and the output member relative to the speed of the vehicle in miles per hour (mph) during cruise conditions.

The operating characteristics of transmission components such as the engine 12, the motor/generator 80 and the output member 19 in the first forward mode are depicted in FIGS. 2 and 3 between the Y-axis and the vertical line A for transient pull conditions. Operating speeds of various components during continuous cruise conditions are illustrated at FIGS. 4 and 5. The speed of the engine 12 is illustrated by plot 190, the speed of the electric unit 80 is illustrated by plot 192 and the speed of the transmission output member 19 is illustrated by plot 194. FIG. 5 illustrates the power of various components during the continuous cruise conditions that result in the speeds of FIG. 4. Horsepower of the engine 12 is denoted by plot 200, horsepower of the electrical unit 80 is denoted by plot 202, and horsepower at the transmission output member 19 is denoted by plot 206. Operating characteristics in the first forward mode during cruising conditions are between the Y-axis and vertical line A' in both FIGS. 4 and 5. In transient pull conditions, for all forward vehicle speeds, the motor/generator 80 operates as a motor to add torque and power to the transmission 10 while in the continuous cruise condition of FIGS. 4 and 5, the motor/generator 80 operates as a generator to power the battery pack 84, or other vehicle electrical components 86.

Second Forward Mode

The second forward mode indicated in FIG. 1B is established with the engagement of the torque-transmitting mechanisms 60 and 64 and establishes a first fixed forward speed ratio. A "fixed speed ratio" is an operating condition in which the power input to the transmission is transmitted mechanically to the output member, and no power flow is necessary in the motor/generators. An electrically variable transmission that may selectively achieve fixed speed ratios for operation near full engine power can be smaller and lighter for a given maximum capacity. Fixed ratio operation may also result in lower fuel consumption when operating under conditions where the engine speed can approach its optimum without using the motor/generators. A variety of fixed speed ratios and variable ratio spreads can be realized by suitably selecting the tooth ratios of the planetary gear sets or gear members in a transmission.

The torque-transmitting mechanism 60 connects the input member 17 and ring gear member 24 with the sun gear member 22 and the torque-transmitting mechanism 64 connects the ring gear member 44 with the transmission housing 78. The planetary gear sets 20 and 30 as well as the sun gear member 42 rotate at the same speed as the input member 17. The ring gear member 44 does not rotate. The carrier member 49 rotates at the same speed as the output member 19. The carrier member 49, and therefore the output member 19, rotates at a speed determined from the speed of the sun gear member 42 and the ring gear/sun gear tooth ratio of the planetary gear set 40. The operating characteristics of the transmission components in the second forward mode/first fixed speed ratio are depicted at FIGS. 2 and 3 between the vertical lines A and B for transient pull conditions and at FIGS. 4 and 5 between vertical lines A' and B' (for cruising conditions).

Third Forward Mode

A third forward mode is established with the engagement of the torque-transmitting mechanisms 62 and 64 and results in a second fixed forward speed ratio as indicated in FIG. 1B. The torque-transmitting mechanism 62 grounds the sun gear member 22 to the transmission housing 78 and the torque-transmitting mechanism 64 grounds the ring gear member 44 to the transmission housing 78. The ring gear member 24 rotates at the same speed as the input member 17. The carrier members 29 and 39 rotate at the same speed. The sun gear member 22, the ring gear member 34 and the ring gear member 44 do not rotate. The carrier member 29 rotates at a speed determined from the speed of the ring gear member 24 and the ring gear/sun gear tooth ratio of the planetary gear set 20. The sun gear member 32 rotates at the same speed as the sun gear member 42. The sun gear member 32 rotates at a speed determined from the speed of the carrier member 39, and the ring gear/sun gear tooth ratio of the planetary gear set 30. The carrier member 49 rotates at the same speed as the output member 19. The carrier member 49, and therefore the output member 19, rotates at a speed determined from the speed of the sun gear member 42, and the ring gear/sun gear tooth ratio of the planetary gear set 40. The operating characteristics of transmission components in the third forward mode are depicted at FIGS. 2 and 3 between vertical lines B and C for transient pull conditions and at FIGS. 4 and 5 between vertical lines B' and C' (for cruising conditions).

Fourth Forward Mode

A fourth forward mode is established with the engagement of the torque-transmitting mechanisms 64 and 66 and results in a third fixed forward speed ratio, as indicated in FIG. 1B. The torque-transmitting mechanism 64 grounds the ring gear member 44 to the transmission housing 78 and the torque-transmitting mechanism 66 connects the carrier members 39 and 49 with one another. The ring gear member 24 rotates at the same speed as the input member 17. The carrier members 29, 39 and 49 rotate at the same speed as the output member 19. The sun gear member 22 rotates at the same speed as the ring gear member 44. The carrier member 29, and therefore the output member 19, rotates at a speed determined from the speed of the sun gear member 22, the speed of the ring gear member 24 and the ring gear/sun gear tooth ratio of the planetary gear set 20. The operating characteristics of the transmission components in the fourth forward mode are depicted in FIGS. 2 and 3 between vertical lines C and D (for transient pull conditions) and at FIGS. 4 and 5 between vertical lines C' and D' (for cruising conditions).

Fifth Forward Mode

A fifth forward mode is established with the engagement of the torque-transmitting mechanisms 62 and 66 and establishes a fourth fixed forward speed ratio. The torque-transmitting mechanism 62 connects the sun gear member 22 with the transmission housing 78 and the torque-transmitting mechanism 66 connects the carrier member 39 with the carrier member 49. The ring gear member 24 rotates at the same speed as the input member 17. The carrier members 29, 39 and 49 rotate at the same speed as the output member 19. The sun gear member 22 does not rotate. The carrier member 29, and therefore the output member 19, rotates at a speed determined from the speed of the ring gear member 24 and the ring gear/sun gear tooth ratio of the planetary gear set 20. Operating characteristics of transmission components in the fifth forward mode are depicted at FIGS. 2 and 3 between vertical lines D and E (for transient pull conditions) and at FIGS. 4 and 5 between vertical lines D' and E' (for cruising conditions).

Sixth Forward Mode

A sixth forward mode is established with the engagement of the torque-transmitting mechanisms 60 and 66 and results in a direct drive ratio of 1.0 with the input member 17 and output member rotating 19 at the same speed, as indicated in FIG. 1B. This direct drive ratio is established with the engagement of the torque-transmitting mechanisms 60 and 66. The torque-transmitting mechanism 60 connects the ring gear member 24 with the sun gear member 22 and the torque-transmitting mechanism 66 connects the carrier members 39 and 49 with one another. Each of the planetary gear sets 20, 30 and 40 rotate at the same speed as the input member 17. Operating characteristics of the transmission components in the sixth forward mode are depicted in FIGS. 2 and 3 between vertical lines E and F (for transient pull conditions) and at FIGS. 4 and 5 between vertical lines E' and F' (for cruising conditions).

Seventh Forward Mode

A seventh forward mode is established with the engagement of the torque-transmitting mechanism 66. The ring gear member 24 rotates at the same speed as the input member 17. The carrier members 29, 39 and 49 are interconnected to rotate at the same speed as the output member 19. The sun gear member 22 rotates at the same speed as the ring gear member 24. The carrier member 29, and therefore the output member 19, rotates at a speed determined from the speed of the sun gear member 22 and the ring gear/sun gear tooth ratio of the planetary gear set 20. Operating characteristics of the transmission components in the seventh mode are depicted at FIGS. 2 and 3 to the right of vertical line F (for transient pull conditions) and at FIGS. 4 and 5 to the right of vertical line F' (for cruising conditions).

As is apparent from FIGS. 2 and 3, in the overdrive seventh range, in order for the motor/generator to operate as a motor, it must rotate in a direction opposite that of the engine and output member 19. It rotates at a low speed such that very little power goes through the motor/generator 80, but significant torque is added. When the motor/generator 80 is controlled to act as a motor in the seventh forward mode, power flows from the engine 12 and input member 17 through the ring gear member 24 and the intermeshing pinion gears 27 to the carrier member 29. Power flows from the carrier member 29 to both carrier members 39 and 49 via interconnecting member 70. Power flowing to the carrier member 49 is transmitted to the output member 19. Power flows from the battery pack 84 to cause the motor/generator 80 (and interconnecting member 74) to rotate in an opposite direction as the input member 17 and output member 19, adding power to the planetary gear set 30 which flows through the sun gear member 32, the pinion gears 37 and to the ring gear member 34, where it is added to the power delivered from the planetary gear set 20 to the carrier member 39. This power then circulates back to the planetary gear set 20 via the interconnecting member 72, to be added to the power delivered from the input member 17 at the carrier member 29.

During continuous operation, as depicted in FIGS. 4 and 5, in the seventh forward mode the motor/generator 80 rotates slowly in the same direction as engine 12 and output member 19 because the motor/generator must operate as the generator. Only a relatively small amount of electric power goes through the motor/generator and the speed of the motor/generator is low; however, torque of the motor/generator is high. When the motor/generator 80 is controlled to act as a generator in the seventh forward mode, power flows from the engine 12 and input member 17 through the first planetary gear set 20 to both carrier members 39 and 49 and to the output member 19 in the same manner as described above. However, power flowing to the carrier member 39 is split by the planetary gear set 30, with some of the power flowing through the pinion gears 37 and sun gear member 32 to power the motor/generator 80. Power flows to the battery pack 84 or other electrical components 86 to cause the motor/generator 80 (and interconnecting member 74) to rotate in the same direction as the input member 17 and output member 19. The rest of the power flowing to the carrier member 39 circulates back to the planetary gear set 20 via the pinion gears 37, the ring gear member 34 and the interconnecting member 72. The power circulated back to the planetary gear set 20 then flows through the sun gear member 22, the pinion gears 27 and the carrier member 29.

As is evidenced in FIGS. 3 and 5, power at the transmission output member 19 is lowest in any given forward mode just after the shift to that mode. This "droop" in engine power may be supplemented by operating the motor/generator 80 as a motor to add torque and therefore power during the period of drop in engine power.

Thus, the transmission 10 provides fuel economy and emissions benefits by utilizing an electrically (battery) powered reverse and first forward mode while still providing five fixed forward ratios and a seventh, overdrive mode in which the motor/generator 80 may add power to the transmission 10 or may act as a generator to recharge the energy storage device 84 while operating at a very low speed.

While the best modes for carrying out the invention have been described in detail, those familiar with the art to which this invention relates will recognize various alternative designs and embodiments for practicing the invention within the scope of the appended claims.

The invention claimed is:

1. A hybrid electro-mechanical transmission comprising:
    an input member for receiving power from a power source;
    an output member for delivering power from the transmission;
    a single motor/generator;
    an energy storage device for interchanging electrical power with said motor/generator;
    three planetary gear sets utilizing first, second and third members;
    wherein said first, second and third planetary gear sets are coaxially aligned;
    wherein said motor/generator annularly circumscribes at least one of said planetary gear sets;
    first, second and third interconnecting members each continuously interconnecting a different one of said members of one of said planetary gear sets to another different one of said members of another of said planetary gear sets; and
    four torque-transmitting mechanisms operative to connect said members of said gear sets with other members or with a stationary member and selectively engagable alone or in pairs to provide a reverse mode powered only be said motor/generator, a launch mode powered only by said motor/generator, and at least five fixed forward speed ratios powered by said power source and with selective assisting power by said motor/generator.

2. The electro-mechanical transmission of claim 1, wherein said first member of said first planetary gear set is continuously connected with said input member;
    wherein said first member of said third planetary gear set is continuously connected with said output member;
    wherein said first interconnecting member continuously connects said second member of said first planetary gear set with said first member of said second planetary gear set;
    wherein said second interconnecting member continuously connects said third member of said first planetary gear set with said second member of said second planetary gear set; and
    wherein said third interconnecting member continuously connects said third member of said second planetary gear set with said second member of said third planetary gear set.

3. The electro-mechanical transmission of claim 2, wherein said first torque-transmitting mechanism selectively connects said input member with said third member of said first planetary gear set to thereby cause all members of said first planetary gear set to rotate at a speed of said input member.

4. The electro-mechanical transmission of claim 2, wherein said second torque-transmitting mechanism selectively connects said third member of said first planetary gear set with said stationary member.

5. The electro-mechanical transmission of claim 2, wherein said third torque-transmitting mechanism selectively connects said third member of said third planetary gear set with said stationary member.

6. The electro-mechanical transmission of claim 2, wherein said fourth torque-transmitting mechanism selectively connects said interconnected second member of said first planetary gear set and first member of said second planetary gear set with said output member.

7. The electro-mechanical transmission of claim 2, further comprising a control unit for regulating electrical power interchange between said energy storage device and said motor/generator.

8. A hybrid electro-mechanical transmission comprising:
    an input member for receiving power from a power source;
    an output member for delivering power from the transmission;
    a single motor/generator;
    an energy storage device for interchanging electrical power with said motor/generator;
    three planetary gear sets utilizing first, second and third members;
    said first member of said first planetary gear set being continuously connected to said input member;
    said first member of said third planetary gear set being continuously connected with said output member;
    a first interconnecting member continuously connecting said second member of said first planetary gear set with said first member of said second planetary gear set;
    a second interconnecting member continuously connecting said third member of said first planetary gear set with said second member of said second planetary gear set;
    a third interconnecting member continuously connecting said third member of said second planetary gear set with said second member of said third planetary gear set;
    said motor/generator being continuously connected with said third interconnecting member for common rotation therewith; and
    four torque-transmitting mechanisms operable for selectively connecting selected ones of said members of said planetary gear sets with selected ones of said input member, said output member, a stationary member or other of said members of said planetary gear sets to establish an electrically variable reverse mode powered only by said motor/generator, a forward mode powered by said motor/generator and selectively also by said power source; and at least five fixed forward speed ratios between said input member and said output member.

9. The electro-mechanical transmission of claim 8, wherein said first, second and third planetary gear sets are coaxially aligned.

10. The electro-mechanical transmission of claim 9, wherein said motor/generator annularly circumscribes at least one of said planetary gear sets.

11. The electro-mechanical transmission of claim 8, wherein said interconnecting members are concentric.

12. A hybrid electro-mechanical transmission comprising:
    an input member for receiving power from a power source;
    an output member for delivering power from the transmission;
    a single motor/generator;
    an energy storage device for interchanging power with said motor/generator;
    three planetary gear sets utilizing first, second and third members;
    one of said members of said first planetary gear set being continuously connected with said input member;
    one of said members of said third planetary gear set being continuously connected with said output member;

said motor/generator being continuously connected to one of said members of said third planetary gear set not continuously connected with said output member;

a first torque-transmitting mechanism selectively connecting said one of said members of said first planetary gear set continuously connected with said input member with another one of said members of said first planetary gear set;

a second torque-transmitting mechanism selectively connecting one of said members of said first planetary gear set not continuously connected with said input member with a stationary member;

a third torque-transmitting mechanism selectively connecting one of said members of said third planetary gear set not continuously connected with said motor/generator with said stationary member;

a fourth torque-transmitting mechanism selectively connecting one of said members of said second planetary gear set with said member of said third planetary gear set continuously connected with said output member;

a first interconnecting member continuously connecting a member of said first planetary gear set with a member of said second planetary gear set;

a second interconnecting member continuously connecting a member of said first planetary gear set not interconnected by said first interconnecting member with a member of the second planetary gear set; and a third interconnecting member continuously connecting a member of said second planetary gear set not interconnected by said first or second interconnecting members with said member of said third planetary gear set that is continuously connected with said motor/generator.

13. The hybrid electro-mechanical transmission of claim 12, wherein said first, second and third members of each of said planetary gear sets include a ring gear member, a sun gear member and a carrier member; wherein said ring gear member of said first planetary gear set is continuously connected with said input member;

wherein said carrier member of said third planetary gear set is continuously connected with said output member;

wherein said carrier member of said first planetary gear set is continuously connected with said carrier member of said second planetary gear set via said first interconnecting member;

wherein said sun gear member of said first planetary gear set is continuously connected with said ring gear member of said second planetary gear set via said second interconnecting member; and wherein said sun gear member of said third planetary gear set is continuously connected with said motor/generator and is continuously connected to said sun gear member of said second planetary gear set via said third interconnecting member.

14. The hybrid electro-mechanical transmission of claim 12, wherein said first torque-transmitting mechanism selectively connects said ring gear member of said first planetary gear set with said sun gear member of said first planetary gear set.

15. The hybrid electro-mechanical transmission of claim 12, wherein said second torque-transmitting mechanism selectively connects said sun gear member of said first planetary gear set with said stationary member.

16. The hybrid electro-mechanical transmission of claim 12, wherein said third torque-transmitting mechanism selectively connects said ring gear member of said third planetary gear set with said stationary member.

17. The hybrid electro-mechanical transmission of claim 12, wherein said fourth torque-transmitting mechanism selectively connects said carrier member of said second planetary gear set with said carrier member of said third planetary gear set.

18. The hybrid electro-mechanical transmission of claim 12, wherein selective engagement of selected ones of said four torque-transmitting mechanisms alone or in pairs provides at least five fixed forward speed ratios whether or not power flows through said motor/generator.

19. The hybrid electro-mechanical transmission of claim 12, wherein said first, second and third planetary gear sets are coaxially aligned; and wherein said motor/generator annularly circumscribes at least one of said planetary gear sets.

* * * * *